United States Patent [19]
Rosaen

[11] 3,910,114
[45] Oct. 7, 1975

[54] DUAL VANE FLOW METER

[75] Inventor: Nils O. Rosaen, Bloomfield Hills, Mich.

[73] Assignee: Nancy Helen Rosean, Ann Arbor, Mich.; a part interest

[22] Filed: Aug. 12, 1974

[21] Appl. No.: 496,728

[52] U.S. Cl. .................................. 73/228; 73/186
[51] Int. Cl.² ........................................... G01F 1/28
[58] Field of Search .............. 73/186, 188, 225, 228

[56]  References Cited
UNITED STATES PATENTS
3,282,102  11/1966  Rosaen ................................ 73/228

Primary Examiner—Donald O. Woodiel
Assistant Examiner—John S. Appleman
Attorney, Agent, or Firm—Gifford, Chandler & Sheridan

[57] ABSTRACT

A positive displacement flow meter comprising a housing, said housing having an inlet and an outlet, a first vane rotatably mounted on a first shaft and a second vane rotatably mounted on a second shaft, and meshing gear means carried by each shaft. Resilient means urge the vanes to a closed position whereby fluid communication is closed between the inlet and the outlet. Indicator means are carried by one of the shafts to provide a visual indication of the fluid flow rate through the flow meter.

8 Claims, 5 Drawing Figures

DUAL VANE FLOW METER

BACKGROUND OF THE INVENTION

I. Field of the Invention

The present invention relates to fluid systems and more particularly to a positive displacement dual vane flow meter with means for indicating the rate of fluid flow through the system.

II. Prior Art

Previously known flow meters, such as that described in my previous U.S. Letters Pat. No. 3,282,102, issued on Nov. 1, 1966, have been generally accepted throughout the trade and have proven to be commercially successful. This type of flow meter generally comprises a vane rotatably mounted on a shaft which divides the flow meter inlet and outlet into two fluid chambers when there is no fluid flow through the flow meter. As fluid begins to flow through the flow meter, the vane will rotate with the shaft and permit fluid communication between the flow meter inlet and the outlet. The rotation of the vane is proportional to the fluid flow rate through the flow meter so that a pointer attached to one end of the shaft provides a visual indication of the flow rate externally of the flow meter.

One limitation suffered by the previously known flow meters is that progressively larger flow meter housings are required as the range of anticipated fluid flow rates increases. Large flow meter housings are undesirable for a number of reasons. Such housings are expensive to manufacture not only due to increased material costs, particularly in view of the ever increasing cost of metal, but also due to increased manufacturing and tooling costs. Such housings are also heavy and thus incur higher shipping, installation and assembly costs.

SUMMARY OF THE INVENTION

The present invention overcomes the above mentioned disadvantages of previously known flow meters by providing two vanes, instead of the more conventional single vane, within the flow meter housing. The vanes are rotatably mounted on a pair of shafts which are interconnected at their respective ends by meshing gears. Resilient means urge the vanes to a closed position and divide the housing inlet and outlet into two separate fluid chambers when there is no fluid flow through the flow meter. As fluid flows through the flow meter, the vanes rotate an amount proportionate to the fluid flow rate and permit fluid communication between the inlet and outlet. Indicator means are linked to one of the shafts and provide a visual indication of the fluid flow rate.

The two vanes, unlike the previously known single vane flow meter, permit a fluid rate range which is substantially twice as large as the range for previously known flow meters for approximately the same housing size. In other words, with a specified fluid flow rate range, the flow meter housing of the present invention is approximately one half the size of previously known flow meter housings. Thus it can be seen that the flow meter of the present invention provides substantial savings in manufacturing, transportation, and installation costs as previously explained.

BRIEF DESCRIPTION OF THE DRAWINGS

The flow meter of the present invention will be more fully understood by reference to the following detailed description when read in conjunction with the accompanying drawings, wherein like reference characters refer to like parts throughout the several views, and in which.

DETAILED DESCRIPTION

Figure 1:
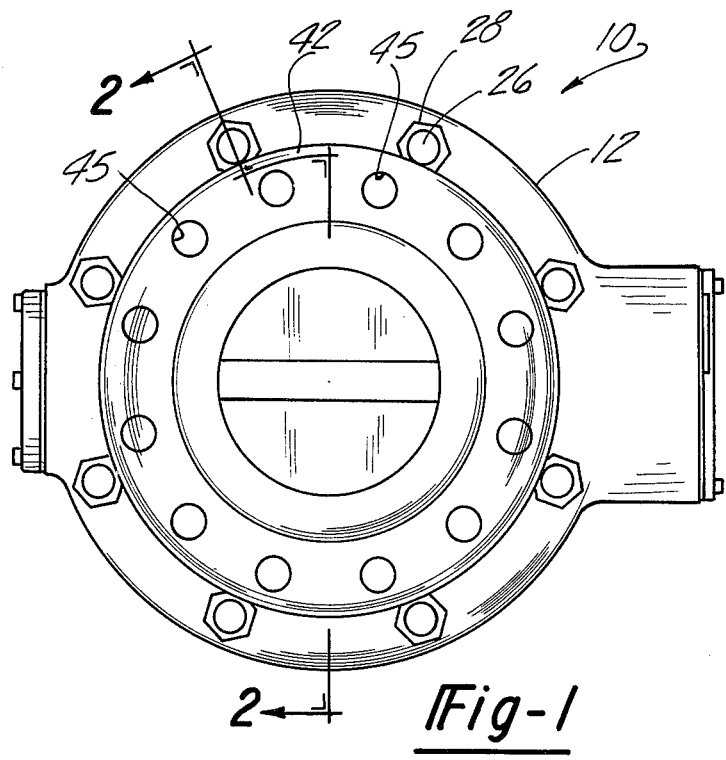
FIG. 1 is a side elevational view of a flow meter constructed in accordance with the present invention.
Figure 2:
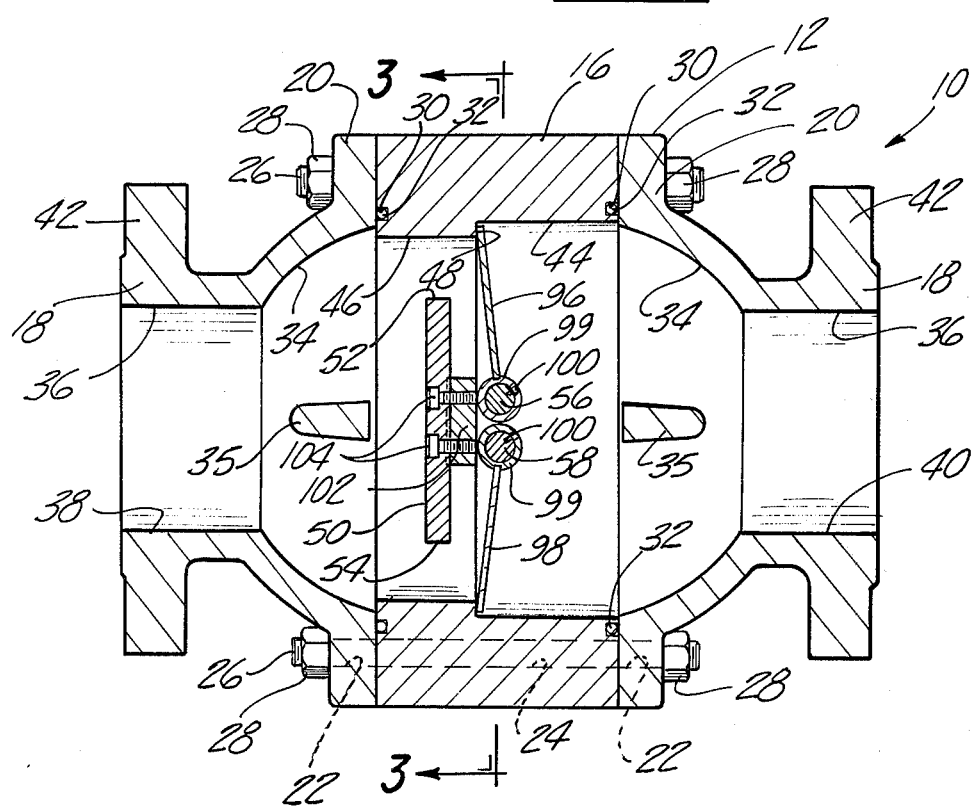
FIG. 2 is a cross sectional view taken substantially along line 2—2 in FIG. 1.

Referring particularly to FIGS. 1 and 2, the flow meter 10 of the present invention is enclosed within a housing 12. The housing 12 generally comprises a central cylindrical section 16 and two end sections 18 which are substantially structurally identical. Each end section includes an annular flange 20 having a number of axial bores 22 therethrough. The bores 22 register with axial bores 24 drilled or otherwise formed through the central housing section 16 so that a corresponding number of studs 26 may be inserted through the three registering bores 22 and 24 in the two end sections 18 and the central section 16. Nuts 28 are then threaded onto the studs 26 and tightened to secure the end sections 18 to the central housing section 16. Preferably, the central housing section 16 includes an annular groove 30 on each end adjacent the flanges 20 which is adapted to receive an O-ring 32 therein in order to provide a sealing engagement between the end and central housing sections.

Each end section 18 further comprises a hemispherical wall section 34 having a transverse support rib 35 thereacross and a radially disposed bore 36. The bores 36, as will be later more clearly understood, function as an inlet port 38 and an outlet port 40. An annular flange 42 having a number of apertures 45 therethrough is provided around the outer end of the bore 36 and permits simple attachment to a conduit (not shown).

The central housing section 16, in contrast to the end sections 18, has an axial bore 44 therethrough. A reduced portion 46 of the bore 44 forms an annular abutment surface 48 around the inner surface of the central housing portion 16. The central housing section 16 also includes a transverse mounting plate 50 across the reduced portion 46 of the bore 44. As viewed from FIG. 2, the plate 50 does not extend vertically across the entire reduced portion 46 of the bore 44, but rather the top surface 52 and the bottom surface 54 are equidistantly spaced away from the reduced bore portion 46.

Figure 3:
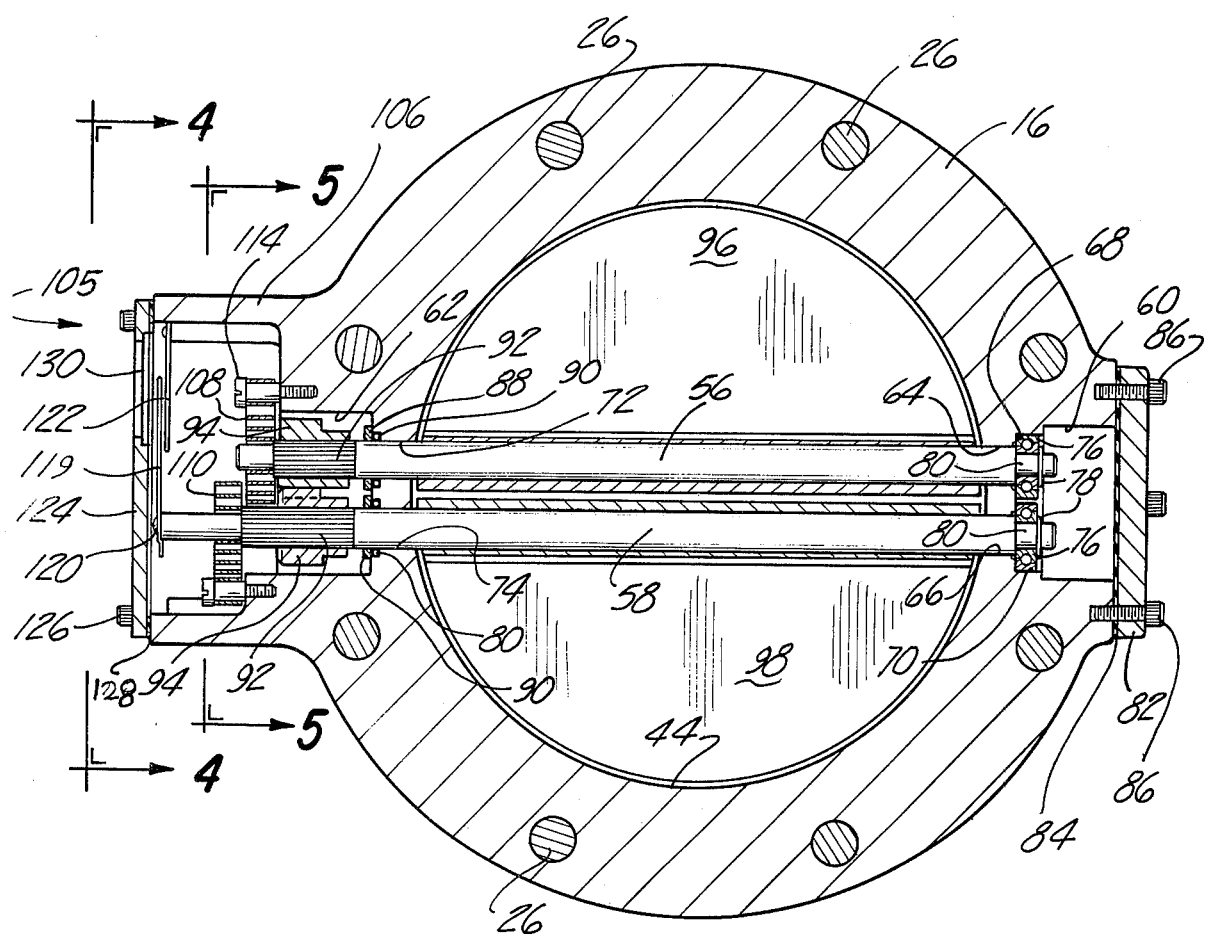
FIG. 3 is a cross sectional view taken substantially along line 3—3 in FIG. 2.

Referring now particularly to FIGS. 2 and 3, the central housing section 16 includes a first and second recess 60 and 62, respectively, at opposing sides of the central housing section 16. A pair of spaced and parallel apertures 64 and 66, having enlarged portions 68 and 70, respectively, are substantially radially disposed between the recess 60 and the bore 44. Similarly, apertures 72 and 74, which respectively register with apertures 64 and 66, are provided between the recess 62 and the central housing bore 44.

A first shaft 56 is rotatably mounted through registering apertures 64 and 72, while a second shaft 58, which is somewhat longer than the first shaft 56, is rotatably mounted through registering apertures 66 and 74. The shafts 56 and 58 are preferably journalled in ball bearing races 76 in the enlarged portions 68 and 70 of apertures 64 and 66, respectively, and a C-clip 78 engages a reduced portion 80 of the shafts 56 and 58 to prevent axial movement of the shaft as will become shortly apparent. A cover plate 82 with appropriate sealing means 84 is secured by bolts 86 over the recess 60 and prevents the entry of foreign matter into the recess 60.

Within the recess 62 a C-clip 88 and an O-ring 90 are conventionally disposed around each shaft 56 and 58. The C-clips 78 and 88 attached to each end of the shafts 56 and 58 function to prevent axial movement of the shafts 56 and 58 while the O-ring 90 prevents fluid communication between the recess 62 and the bore 44 of the central housing section 16.

The shafts 56 and 58 are splined, as shown at 92, within the recess 62 and substantially identical and meshing gears 94 are press fit onto the shafts 56 and 58. Any conventional means such as a set screw key, or the like may of course be utilized to secure the gears 94 to the shafts 56 and 58. It can thus be seen that with the gears 94 so attached, axial rotation of one shaft 56 or 58 causes a rotation of the other shaft 58 or 56 which is equal in the degree of rotation but opposite in direction.

Semicircular vanes 96 and 98 with sleeves 99 are secured by screws 100 through the sleeves 99 to the shafts 56 and 58 respectively. As best shown in FIG. 2, the vanes 96 and 98 are positioned on the shafts 56 and 58 so that the outer periphery of each vane 96 and 98 simultaneously abuts against the annular abutment surface 48. Furthermore, the radius of each vane 96 or 98 is substantially the same as the radius of the hemispherical wall section 34 of the end housing section 20. The axis of rotation for the vanes 96 and 98, however, is offset from the center of the hemispherical wall section 34. Thus as the vanes 96 and 98 rotate towards the wall section 34, the area between the vanes 96 and 98 and the wall section 34 will gradually increase as will be more fully described hereinafter.

An elongated rectangular block 102 is secured to the transverse mounting plate 50 by screws 104. The block 102 extends transversely entirely across the reduced portion 46 of the bore 44 and abuts against the sleeves 99 on both vanes 96 and 98. The abutting force between the block 102 and the vane sleeves 99, however, is small so as to minimize friction between the block 102 and vane sleeves 99 as the vanes 96 and 98 pivot.

Figure 4:
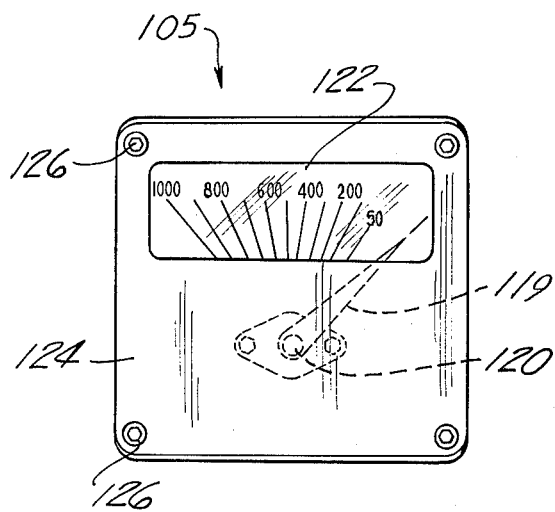
FIG. 4 is a fragmentary elevational view taken substantially along line 4—4 in FIG. 3.
Figure 5:
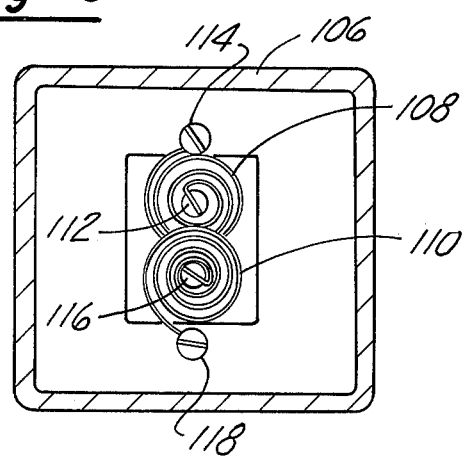
FIG. 5 is a partial cross sectional view taken along line 5—5 in FIG. 3.

Referring now particularly to FIGS. 3–5, indicating means 106 are included as an integral part of the present invention to provide an externally visible indication of the pivotal position of the vanes 96 and 98 and hence the rate of fluid flow through the flow meter 10. To achieve this end the central housing section 16 includes an indicator means housing 105 externally adjacent to and enclosing the recess 62. The indicator means housing 106 is preferably integral with the central housing section 16 but may be separately constructed and secured to the central housing section 16 in any conventional manner.

The indicator means housing 106 includes two oppositely wound low tension coil springs 108 and 110. The spring 108 has one end secured to the end of the shaft 56 by any conventional means, such as a slot 112, and the other spring end to the housing 106 by a screw 114. The second spring 110 is similarly secured between the housing 106 and the shaft 58 by a slot 116 and a screw 118. Since the springs 108 and 110 overlap each other, the spring 110 is disposed slightly forward of the spring 108 thereby eliminating any interference between the springs 108 and 110. Furthermore the springs 108 and 110 are preloaded so as to urge the shafts 56 and 58 with the attached vanes 96 and 98 to the position shown in FIG. 2, i.e. with the outer periphery of the vanes 96 and 98 abutting against the annular abutment surface 48.

A pointer arm 119 is secured by a screw 120 to the end of shaft 58 and leftward as viewed from FIG. 3 of an indicia carrying plate 122. The indicia carrying plate 122 is secured to the housing 106 in any conventional manner so that the plane of the plate 122 is normal to the axis of the shaft. Hence, as the shaft 58 rotates, the pointer arm 119 will swing across the face of the indicia carrying plate 122.

A cover plate 124 encloses the open side of the indicator housing 106 and is secured thereto by bolts 126. Preferably an annular seal 128 is provided intermediate the cover plate 124 and the indicator housing 106 to prevent foreign matter from entering the housing 106. The cover plate 124 further includes a window 130 constructed of transparent material, such as glass or plastic, so that the indicia carrying plate may be viewed through the cover plate 124.

Having described the component parts of my invention, the operation of my dual vane flow meter is as follows: Referring particularly to FIGS. 2 and 3, the coil springs 108 and 110 urge the shafts 56 and 58 with the attached vanes 96 and 98 to the position shown in FIG. 2, i.e. with the outer periphery of the vanes abutting against the annular abutment surface 48. In this position the vanes 96 and 98 together act as a partition and divide the flow meter inlet 38 and outlet 40 into two separate fluid chambers. The block 102 which abuts against the vane sleeves 99 effectively prevents fluid flow through the space intermediate the vane sleeves 99.

As fluid begins to flow through the flow meter, the vanes 96 and 98 swing toward the outlet 40 thus exposing a curved opening between the outer periphery of each vane and the bore 44 of the central housing section 16 and providing fluid communication between the inlet 38 and the outlet 40. Since the vanes 96 and 98 are interconnected via shafts 56 and 58 and gears 94, the area of the curved opening between each vane 96 or 98 and the bore 44 will be substantially the same for each rotational position of the shafts 56 and 58. In addition, since the radii of the vanes 96 and 98 are substantially the same as both the bore 44 and the hemispherical wall section 34 and since the axis of rotation for the vanes 96 and 98 is offset from the center of the hemispherical wall section 34, the size of the aforementioned opening increases proportionately with the rotational position of the vanes 96 and 98.

As heretofore described, the size of the opening increases proportionately with the rotational position of the vanes 96 and 98. Thus at each rate of fluid flow through the flow meter, the vanes 96 and 98 will be moved to a rotational position which provides a total opening between the vanes 96 and 98 and bore 44 and/or the hemispherical wall section 34 of a sufficient area to accommodate the flow rate through the flow meter. The springs 108 and 110, which are low tension springs and offer only a slight resistance via the vanes 96 and 98 to the fluid passing through the flow meter, act against the fluid flow and maintain the minimum required opening between the vanes 96 and 98 and the bore 44 and/or wall section 34 to accommodate the fluid flow.

The rotational position of the vanes 96 and 98, which is proportional to the fluid flow as described above, is utilized to provide an external indication of the fluid flow rate through the flow meter 10 in the following manner. Referring particularly to FIGS. 3 and 4, the pointer arm 119 is secured to the shaft 58. As the vanes assume a rotational position in response to the fluid flow rate, the shaft 58 will likewise rotate and proportionately swing the pointer arm 119 across the indicia carrying plate 122. The pointer arm 119 thus assumes different positions across the indicia carrying plate 122 as the fluid flow rate, and hence the rotational position of the shaft 58, varies.

As explained above, the flow meter of the present invention is capable of measuring substantially twice the fluid flow rate than previously known single vane flow meters for substantially the same size of housing.

It is thus apparent that, by providing a flow meter having much smaller housing than previously known flow meters having the same fluid flow range, the present invention achieves substantial savings not only in material and manufacturing costs, but also in assembly, shipping and installation costs.

Having described my present invention, many modifications and alterations will become apparent to those skilled in the art to which the invention pertains without departing from the spirit of the invention as defined by the scope of the appended claims.

I claim:

1. A flow meter for a fluid system comprising:

a housing having an inlet and an outlet adapted to be connected with said system, a first and second vane rotatably mounted in said housing intermediate said inlet and said outlet, means linking said vanes to provide equal rotation in opposite directions;

said housing being provided with a substantially hemispherical interior wall section, said first vane having a substantially semicircular edge rotatable adjacent one half of said hemispherical wall section and said second vane having a semicircular edge rotatable adjacent the second half of said hemispherical wall section, the center of said hemispherical wall section being displaced from the center of the hemisphere circumscribed by the semicircular edge upon rotation of said vanes whereby the space between the semicircular edges of said vanes and said hemispherical wall section varies at each rotated position of said vanes, and means indicating the position of one of said vanes exteriorly of said housing.

2. The invention as defined in claim 1 wherein said first vane is fixed to a first shaft, said second vane is fixed to a second shaft, and said first and second shafts are rotatably mounted in said housing in a spaced and parallel relationship.

3. The invention as defined in claim 2 and including resilient means urging at least one of said shafts in one rotational direction.

4. The invention as defined in claim 3 wherein said resilient means is a coil spring.

5. The invention as defined in claim 1, and in which the radius of each of said vanes is substantially the same as the radius of said hemispherical wall section.

6. The invention as defined in claim 2 and in which said last mentioned means comprises a pointer arm secured onto the end of one of said shafts and generally normal thereto, and an indicia carrying plate adjacent to the outer end of said pointer arm wherein the plane of said indicia carrying plate is substantially normal to the axis of said last mentioned shaft.

7. The invention as defined in claim 2 and in which each of said shafts has a gear secured thereto, said gears being in a meshing engagement.

8. The invention as defined in claim 7 wherein said gears are substantially identical to each other.

* * * * *

UNITED STATES PATENT OFFICE
CERTIFICATE OF CORRECTION

PATENT NO. : 3,910,114
DATED : October 7, 1975
INVENTOR(S) : Nils O. Rosaen

It is certified that error appears in the above—identified patent and that said Letters Patent are hereby corrected as shown below:

Column 3, line 57, delete "105" and insert --106--.

Signed and Sealed this twenty-seventh Day of January 1976

[SEAL]

Attest:

RUTH C. MASON
Attesting Officer

C. MARSHALL DANN
Commissioner of Patents and Trademarks